US008862570B1

(12) United States Patent
Fiszman et al.

(10) Patent No.: US 8,862,570 B1
(45) Date of Patent: Oct. 14, 2014

(54) METHOD AND APPARATUS FOR OPEN MANAGEMENT OF MULTI-MEDIA SERVICES

(75) Inventors: Sergio Fiszman, Nepean (CA); Laurence Beaulleu, Kanata (CA); Paul Ensing, Nepean (CA); Pierre Fournier, Ottawa (CA); Elizabeth Goldrich, Dallas, TX (US); Kevin Howe-Patterson, Nepean (CA); Michael Leeder, Stittsville (CA); David Price, Reading (GB); Chris Ryerson, Kanata (CA); Richard Taylor, Manotick (CA)

(73) Assignee: Rockstar Consortium US LP, Plano, TX (US)

( * ) Notice: Subject to any disclaimer, the term of this patent is extended or adjusted under 35 U.S.C. 154(b) by 1493 days.

(21) Appl. No.: 10/944,565

(22) Filed: Sep. 17, 2004

Related U.S. Application Data

(60) Provisional application No. 60/549,505, filed on Mar. 2, 2004.

(51) Int. Cl.
*G06F 7/00* (2006.01)
(52) U.S. Cl.
USPC ........... 707/713; 707/736; 707/759; 707/802; 705/7.36; 709/218; 709/229
(58) Field of Classification Search
None
See application file for complete search history.

(56) References Cited

U.S. PATENT DOCUMENTS

| 5,204,955 | A | | 4/1993 | Kagei et al. |
| 5,414,812 | A | | 5/1995 | Filip et al. |
| 5,740,357 | A | | 4/1998 | Gardiner et al. |
| 5,748,098 | A | | 5/1998 | Grace |
| 5,826,239 | A | * | 10/1998 | Du et al. ............ 705/8 |
| 5,907,602 | A | | 5/1999 | Peel et al. |
| 6,012,152 | A | | 1/2000 | Douik et al. |
| 6,035,331 | A | | 3/2000 | Soga et al. |
| 6,170,011 | B1 | | 1/2001 | Macleod Beck et al. |
| 6,230,312 | B1 | | 5/2001 | Hunt |
| 6,286,031 | B1 | | 9/2001 | Waese et al. |
| 6,340,977 | B1 | | 1/2002 | Lui et al. |
| 6,370,573 | B1 | | 4/2002 | Bowman-Amuah |
| 6,487,665 | B1 | | 11/2002 | Andrews et al. |
| 6,571,285 | B1 | | 5/2003 | Groath et al. |
| 6,584,508 | B1 | | 6/2003 | Epstein et al. |
| 6,718,486 | B1 | | 4/2004 | Roselli et al. |
| 6,725,048 | B2 | | 4/2004 | Mao et al. |

(Continued)

OTHER PUBLICATIONS

Cavalieri., "A fault recovery model in IEC/ISA FieldBus communication protocol", Jul. 1999, Industrial Electronics, 1999. ISIE '99. vol. 3, pp. 1421-1426.

(Continued)

*Primary Examiner* — Fred I Ehichioya
*Assistant Examiner* — Hasanul Mobin
(74) *Attorney, Agent, or Firm* — Anderson Gorecki & Rouille LLP

(57) ABSTRACT

An architecture which permits externalized management of services includes a number of management service capability (MSC) definitions. Each operator may associate a management service capability with a Service/Service Capability for managing various aspects of the Service/Service Capability. An interface enables a variety of different management systems to utilize a common MSC structure, independent of the information models, transport mechanisms and management interface of the system using the MSC. With such an arrangement, management related integration costs associated with integrating and bundling complex multi-media services is significantly reduced.

21 Claims, 4 Drawing Sheets

(56) References Cited

U.S. PATENT DOCUMENTS

| | | | |
|---|---|---|---|
| 6,813,278 B1 | 11/2004 | Swartz et al. | |
| 6,820,055 B2 | 11/2004 | Saindon et al. | |
| 6,823,382 B2 | 11/2004 | Stone | |
| 6,845,396 B1 | 1/2005 | Kanojia et al. | |
| 6,912,532 B2 | 6/2005 | Andersen | |
| 6,934,756 B2 | 8/2005 | Maes | |
| 7,007,063 B2 | 2/2006 | Creamer et al. | |
| 7,043,160 B1 | 5/2006 | Graves | |
| 7,092,707 B2 | 8/2006 | Lau et al. | |
| 7,099,879 B2 | 8/2006 | Tacaille et al. | |
| 7,221,945 B2 | 5/2007 | Milford et al. | |
| 7,330,717 B2 | 2/2008 | Gidron et al. | |
| 7,343,605 B2 | 3/2008 | Langkafel et al. | |
| 7,383,191 B1 | 6/2008 | Herring et al. | |
| 7,461,385 B2 | 12/2008 | Winter | |
| 2001/0027470 A1* | 10/2001 | Ulmer et al. | 709/203 |
| 2002/0019886 A1* | 2/2002 | Sanghvi et al. | 709/318 |
| 2002/0068545 A1 | 6/2002 | Oyama et al. | |
| 2002/0083166 A1* | 6/2002 | Dugan et al. | 709/223 |
| 2002/0147611 A1* | 10/2002 | Greene et al. | 705/1 |
| 2003/0033379 A1* | 2/2003 | Civanlar et al. | 709/218 |
| 2003/0041139 A1* | 2/2003 | Beadles et al. | 709/223 |
| 2003/0135628 A1 | 7/2003 | Fletcher et al. | |
| 2003/0172145 A1 | 9/2003 | Nguyen | |
| 2003/0188001 A1 | 10/2003 | Eisenberg et al. | |
| 2004/0043793 A1 | 3/2004 | Sakata | |
| 2004/0054743 A1 | 3/2004 | McPartlan et al. | |
| 2004/0156394 A1 | 8/2004 | Westman | |
| 2004/0223602 A1 | 11/2004 | Honkasalo et al. | |
| 2004/0243503 A1 | 12/2004 | Eng et al. | |
| 2004/0243915 A1 | 12/2004 | Doyle et al. | |
| 2004/0249887 A1 | 12/2004 | Garcia-Martin et al. | |
| 2004/0267927 A1 | 12/2004 | Davis et al. | |
| 2005/0004974 A1* | 1/2005 | Sharma et al. | 709/202 |
| 2005/0025047 A1 | 2/2005 | Bodin et al. | |
| 2005/0041584 A1 | 2/2005 | Lau et al. | |
| 2005/0083909 A1 | 4/2005 | Kuusinen et al. | |
| 2005/0286531 A1 | 12/2005 | Tuohino et al. | |
| 2007/0081523 A1 | 4/2007 | Mishra | |
| 2007/0283423 A1 | 12/2007 | Bradley et al. | |

OTHER PUBLICATIONS

Edelweiss, et al., "Workflow modeling: exeption and failure handling representation", Nov. 1998, Computer Science, 1998. SCCC '98, pp. 58-67.

Smarkusky, et al., "Hierarchical performance modeling for distributed system architectures", 2000, Computers and Communicaiton, 2000, pp. 659-664.

Teshigawara, et al., "LAN Fault Management Ensemble", Apr. 1996, Network Operation and Management Symposium, 1996., IEEE, vol. 2, pp. 540-551.

U.S. Appl. No. 10/939,019, Patent No. 7,580,994, Method and Apparatus for Enabling Dynamic Self-Healing of Multi-Media Services.

U.S. Appl. No. 10/937,573, Patent No. 7,653,189, Telecommuncations Service Negotiations.

U.S. Appl. No. 10/983,498, Legacy Proxy CSCR Call Session Control Function.

U.S. Appl. No. 10/890,007, Service Capability Registry.

U.S. Appl. No. 10/890,043, Service Instance Registry.

U.S. Appl. No. 11/010,741, Patent No. 7,646,725, Self-Healing Containers.

* cited by examiner

METHOD AND APPARATUS FOR OPEN MANAGEMENT OF MULTI-MEDIA SERVICES

RELATED APPLICATIONS

This application claims priority under 35 U.S.C. §1.119(e) to U.S. Provisional Patent Application No. 60/549,505 filed Mar. 2, 2004.

FIELD OF THE INVENTION

This invention relates generally to the field of services and more particularly to a method and apparatus for externalizing management service capabilities in a services oriented architecture (SOA).

BACKGROUND OF THE INVENTION

Multi-telecom supporting domains such as Optical, Switching, Wireless, and Voice and data over IP depend upon a set of different information models, protocols and interfaces for their management. As a consequence, Carriers, Service Providers (SPs) and Large Enterprises incur high 'integration taxes' and operation expenses (OpEx) to create, update, validate, integrate, deploy, activate and maintain the management interfaces, protocols and information models. For example, present day management of connectivity functionality is partially supported through the use of multi-proprietary and conventional management Application Programming Interfaces (APIs), protocols and information models, such as Simple Network Management Protocol (SNMP), TeleManagement Forum (TMF) 814, etc. The multi-entry management points associated with the APIs may compromise the integrity, maintainability and effectiveness of the management solution.

The complexity of such a system further frustrates the ability of the system to provide rapid integration and management of end to end services. In addition, it is difficult to perform fast and reliable service deployment, delivery and activation as well as fast service restoration and recovery, and effective and reliable problem notification mechanisms in such a system. As the number and complexity of service offerings continues to increase, the problem of providing reliable and robust service delivery and service management increases.

SUMMARY OF THE INVENTION

According to one aspect of the invention, a system includes a database management system (referred herein as database) comprising of management service capability (MSC) templates/definitions/descriptions. A registry is coupled to the database for tracking instances of MSCs, whose object-oriented representations are stored in the database. A portal is provided for interfacing a services operator to the registry. A cluster server is provided for executing instances of MSCs, and a gateway is coupled with the portal and the server, the gateway having an API enabling direct interaction between the operator and instances of MSCs.

According to another aspect of the invention, a method for operator management of a service provided in a network including the steps of selecting a management service capability from among a set of management service capabilities defined in a database, personalizing the management service capability (SC) according to needs of the subscriber, generating a management service capability instance and associating it to a subscribed Service/SC; and executing the management service capability instance to manage the lifecycle of associated service/service capability instances.

DETAILED DESCRIPTION

Figure 1:
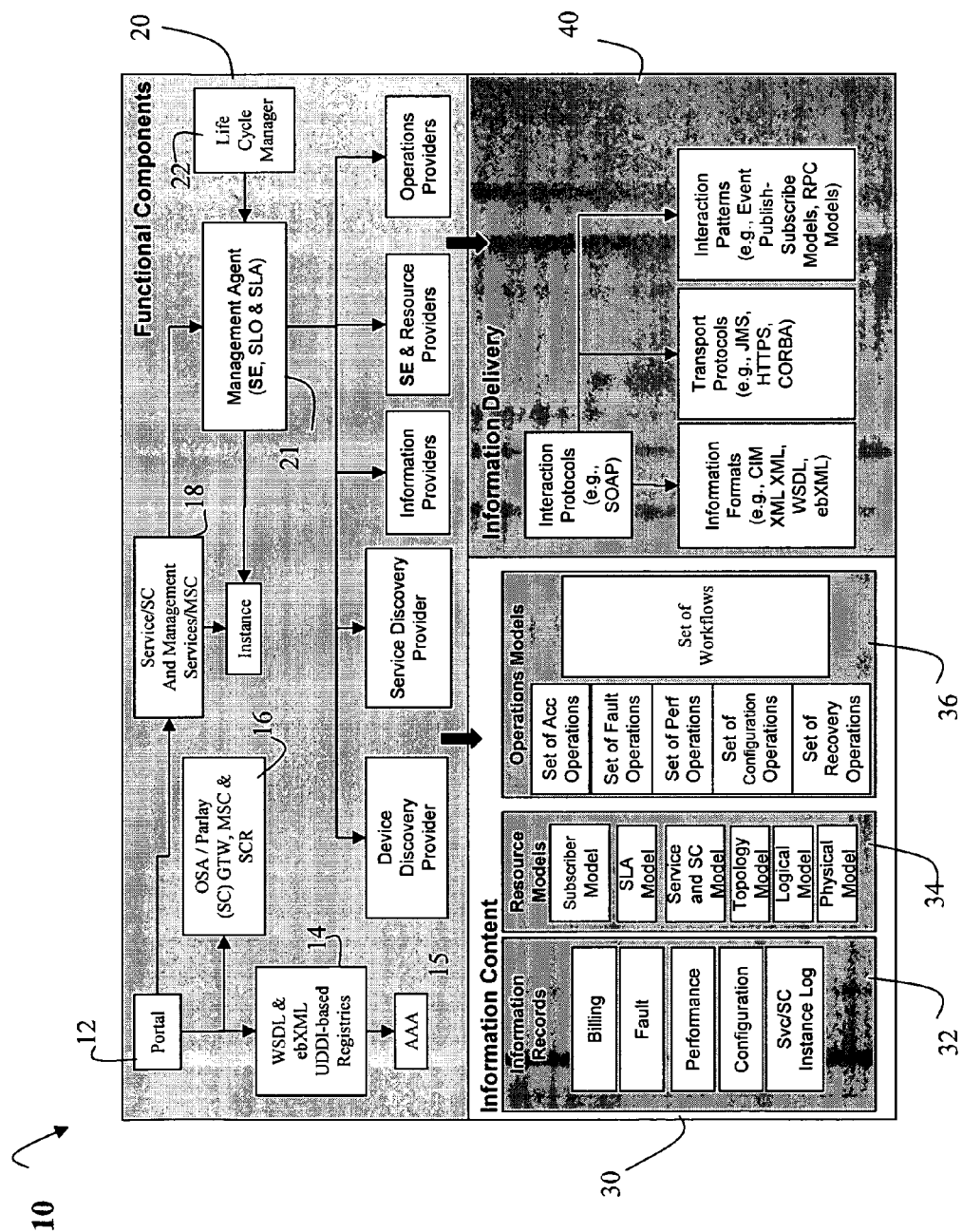
FIG. 1 is a block diagram of an exemplary service management externalization architecture in which the present invention may be implemented.

Referring now to FIG. 1, a management service externalization architecture 10 in which the present invention may be used, includes a functional component 20 which is used to control the delivery and deployment of one or more services or SCs to one or more registries, SEs, and NEs. Information content 30 is a repository of information records, resource models and operation models that are related to the services. Information delivery 40 includes a variety of protocols that may be used to deliver the information content to the functional components 20. Several embodiments of a service architecture such as that shown in FIG. 1 are described in co-pending patent application Ser. No. 10/939,019 filed Sep. 10, 2005, by Fiszman et al, entitled "METHOD AND APPARATUS FOR ENABLING DYNAMIC SELF-HEALING OF MULTI-MEDIA SERVICES," (hereinafter Fiszman) incorporated herein by reference.

The Service Operations Center (SOC) of FIG. 1 is designed using an efficient, robust and low cost architecture which enables a variety of heterogeneous services from various different service providers to be made available to subscribers. For the purposes of this application, a 'service' is an aggregation of service capabilities, communication & non-communication services, and logic (i.e., control) that is self-managed as an autonomous unit and delivered with a service level agreement to a consumer (i.e., the subscriber who pays for the service, and the associated end-users, who request/consume/invoke the service). A service has an interface with a set of externalized representations and bindings to a set of programming languages (e.g., Java, C++, and C), and protocols (e.g. SOAP, SIP) with different transport bindings.

One or more service capabilities may be associated with a service. For the purposes of this application, a 'service capability' is a function provided by an entity (a Service Element (SE) or Network Element (NE)) which implements a discrete set of functions in a service provider's network. Zero or more of these functions may be inter-worked to enable the development, execution and management of services. A 'service capability instance' is an active instantiation of a Service Capability, which has been deployed and activated within a service provider's network.

A Service Level Objective (SLO) maps to a set of performance measurements across a set of Service Capabilities or Services and associated instances. A Service Level Agreement (SLA) is an agreement, executed by or with a Service Provider (SP), defining a selected set of SLOs. Thus, a Service represents an entity consumed by subscribers and managed by the Service Operations Center (SOC).

As mentioned above, the functional component 20 is used to manage services delivered to the consumer, and may be implemented in hardware, software, or a combination thereof. Functional component 20 includes a portal 12, which allows Service Operations Center (SOC) operators to update and retrieve the information stored in the Information Content 30, as well as providing access to different Services, SCs, and MSCs 18. In one embodiment of the invention, the portal has a generic Application Programming Interface (API) which permits operators using various different protocols for managing services across boundaries (e.g., among different Service Providers). The portal may be accessed by, for example, Operational Support Systems (OSS), Business Support Systems (BSS) and Network Managements Systems (NMS), as well as being an interface for Operations/IT personnel (i.e. operators) whom execute externalized management operations.

The functional components also include WSDL and ebXML Universal Description Discovery and Integration (UDDI) based registries 14. The WSDL and ebXML UDDI registries 14 include Service/Service capability descriptions and binding templates, for linking services to the subscribers. The W3C/OASIS standards include a number of Service Definitions which define services available to the subscriber. According to one aspect of the present invention, it is proposed to augment the W3C/OASIS standard Service Definition offerings to include a number of Management Service Definitions, each to be associated with a service available to a subscriber. The Management Service Definitions may define management functionality associated with, for example, Service Level Agreement (SLA) and Quality of Experience (QoE) operations, fulfillment operations (including commissioning, provisioning, and activation operations as well as invocations of TeleManagement Forum (TMF)-based management processes published in ebXML registries), billing and charging related operations, service validation operations, service life cycle operations (including service deployment, service activation, status change and notifications), as well as Information Content access operations.

An Open Service Access (OSA)/Parlay/ParlayX Service Capability Gateway 16 provides access to a Service Capability entity or to a Service Capability naming facility, such as a Service Capability Registry (SCR). According to one aspect of the invention, the OSA/Parlay gateway also provides access to Management Services Capabilities (MSCs) provided in the system. Each MSC instance is an instantiation of a management service capability associated with a service/SC instance consumed by a subscriber. The MSC can be directly accessed by an operator via the portal, thereby externalizing the operations used to manage any one of a variety of aspects of the services. For example, an MSC can be used to manage OSA/Parlay SCs (e.g., Presence, Availability, Session-Control aspects) for a subscriber. As will be described later herein, externalizing management service capabilities effectively abstracts the complexity of existing services' north bound interfaces to OSS, BSS, and NMS by providing a simple generic point of entry for all aspects of service management. With such an arrangement, service automation may be performed in a cost effective manner. As will be described in more detail below, one advantage of providing management services in this manner is that it permits externalization of an SLA framework within Service Management.

Functional components 20 also include management Agent component 21. As described in detail in Fiszman et al., Management Agent (MA) component 21 includes a hierarchy of cooperating Management Agents (MAs). The hierarchy of cooperating MAs uses common information models and protocols to automate service assurance, restoration and recovery, while facilitating integration of heterogeneous and multi-sourced services. The MAs are used by Service or Service Capability Instances to monitor SLA and QoE (Quality of Experience) compliance and to perform actions when SLA violations or Service/SC failures occur. The hierarchical nature of the MAs also facilitate scaling and an extensible management architecture, thereby significantly reducing the TCO and OpEx for Carriers, Service Providers, and Large Enterprises.

In accordance with one aspect of the invention, the Management Agents fulfill and monitor the Services/SCs and associated instances, detect alarms and performance degradations. An MA may, for example, interact with a Management Services Capability (MSC) that is responsible for the fulfillment and assurance of service level objectives defined in a subscriber's SLA with an SP. An example of a Management Service Capability (MSC) and MA interaction will be described later herein.

According to one embodiment of the invention, functional component 20 also includes a Life Cycle Manger 22. The Life Cycle Manager 22 is responsible for posting and removing the service definitions and extensions to the appropriate Web-based registries. In addition, according to one aspect of the invention, the Life Cycle Manager is also responsible for the installation, commissioning, configuration and activation of Management Service Capabilities, as well as posting them in the Web-based registries.

As mentioned above, the service management externalization architecture 10 also includes information content 30 which is accessible by any of the SCs and associated instances, including the MSC and associated instances. Making the information content available via a Management Service Capability effectively externalizes the information content, making it directly available to the operator. Certain information content that would be advantageously externalized and made available to the MSC/operator includes information records 32 related to service instances behavior (e.g., fault, subscribed and measured SLA & SLO, and billing) information, information models associated with subscribers, SLA & SLOs, Service and Service capability aggregation hierarchies, including service topology and supporting network, logical and physical topologies. In addition, the architecture permits a set of operation models 36 to be invoked, using protocols and transports identified in the Information Delivery domain 40. The operations could be used to access information records, information models and workflows that invoke the accounting, fault, performance, configuration, restoration and recovery operations.

Figure 2:
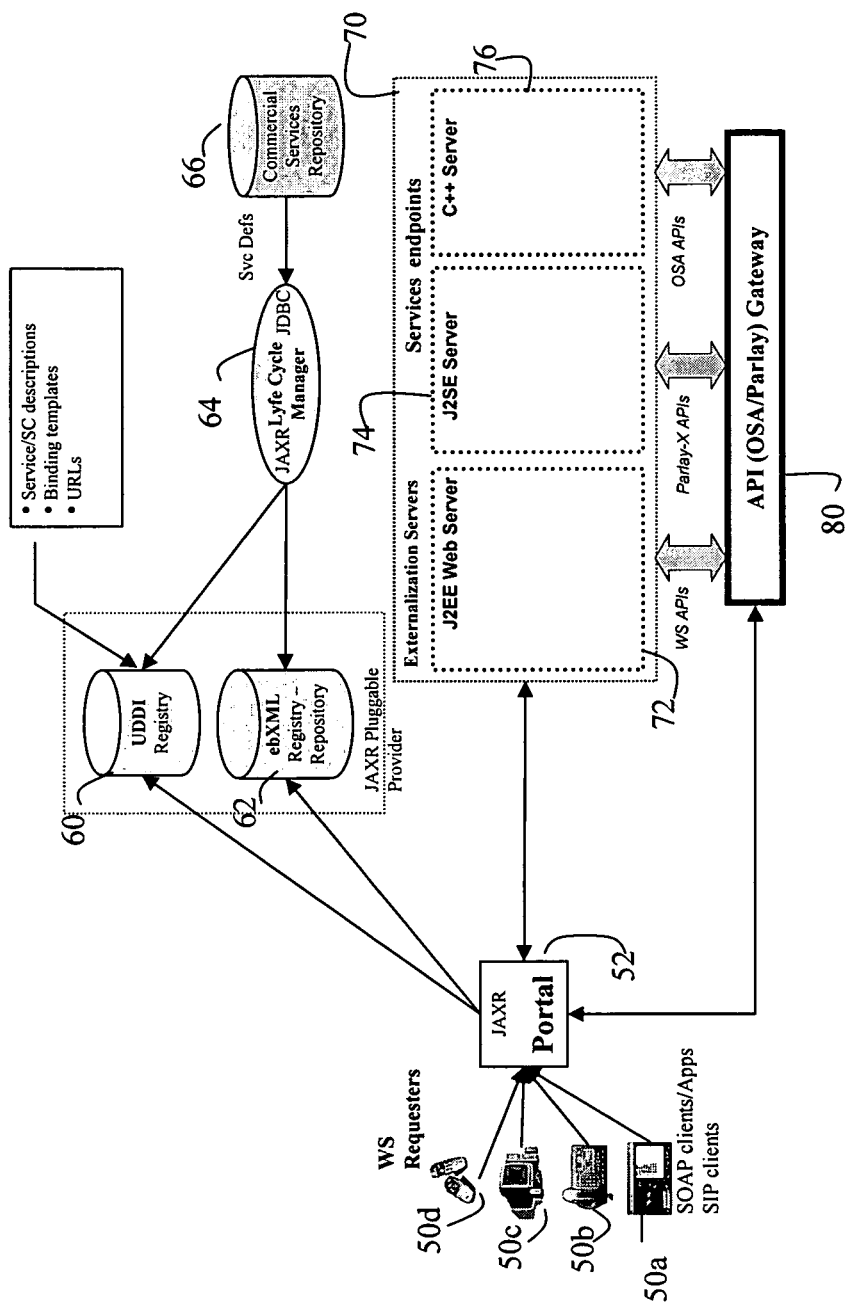
FIG. 2 is a block diagram provided for illustrating a variety of exemplary components that may be included in registries and repositories of the aggregated service oriented architecture of FIG. 1.

Referring now to FIG. 2, an exemplary embodiment of the services architecture of FIG. 1 is shown. A Service Operations Center (SOC) 20 is shown to include portal 12, which provides access to the SOC by a variety of client agents 50a-50d, each of which may use a variety of services including management services of the present invention. The clients may communicate with the portal 12 using any one of variety of protocols, including Simple Object Access Protocol (SOAP), Session Initiated Protocol (SIP), or other protocols known in the art.

A client-subscriber may subscribe to any of the services published in the commercial services repository 66. In general, the commercial services repository 66 stores a template/definition for each service offered. The template outlines the basic structure of the service, and an operator may personalize the service depending upon the subscriber needs (for example by adding trigger-based events or actions as will be described in more detail below). It is also important to note that a subscriber may also personalize aspects of a service by provisioning the subscriber-profile preferences component. The resulting personalized service is referred to hereinafter as an activation of the service. The subscriber invocation of an activated service generates an 'instance' of the Service or SC. Each Service/SC instance has a life cycle. The Life Cycle manager 64 registers the Service/SC with the UDDI or ebXML registries. An entry in the UDDI registry includes, for each Service/SC, a Service/SC description, a binding template (indicating the service endpoints) and Uniform Resource Locators (URLs) associated with the services. Each UDDI entry has a UDDI key which maps a service definition logical identifier to the Service/SC. The Portal provides logical to physical mapping for the Service/SC instances, including the related MSC instances responsible for managing the Service/SC instances' life-cycles.

The portal 12 communicates with Externalization servers 70 either directly (using SOAP messaging, or alternatively via an Application Programming Interface (API) to a gateway 80. In one embodiment, the gateway 80 operates using the OSA/Parlay API & protocols, although this is not a requirement of the invention and other API & protocols may be readily substituted herein.

Thus the API gateway includes logic for communicating with one or more servers shown as block 70 in FIG. 2 as a group of Externalization Servers (ES). Each Externalization Server supports Services/Service Capabilities provided under different protocols and technologies. For example, the Externalization servers (i.e., J2EE Web Server 72, a J2SE Server 74, and a C++ server 76) support Web Service (WS) APIs, Parlay-X APIs, and OSA south-bound APIs.

According to one embodiment of the invention, any of the externalization servers 70 relays requests/responses to the gateway's Management Service Capability (MSC). A MSC may be represented as an object having associated therewith a variety of functions/methods and attributes/structure. One example of an object oriented model which may be used to represent a MSC and associated instances in the Content Repository is a Common Information Model (CIM), developed by the Distributed Management Task Force (DMTF). CIM is one standard for the exchange of management information in a platform-independent and technology-neutral way, streamlining integration and reducing costs by enabling end-to-end multi-vendor interoperability in management systems. The CIM also includes a number of standard models (data schema) for Systems, Applications, Networks and Device and other components, expressed in 'mof' language. This standardization enables applications from different developers on different platforms to describe management data in a standard way so that it may be shared among a variety of management applications. A compiler, which acts as a WBEM client compiles the mof code, and loads it into a WBEM server. The compiler may produce other output, including skeleton code for providers and user documentation.

One version of the CIM is provided by the Web-Based Enterprise Management (WBEM) standard. WBEM is a set of management and Internet standard technologies developed to unify the management of enterprise computing environments. The DMTF has developed a core set of standards that make up WBEM, which includes the Common Information Model. Although the below description will describe an architecture which uses CIM-WBEM objects, the present invention is not limited to any particular type of object format, and thus any other object oriented model (such as TMF SID) may alternatively be substituted herein.

In an embodiment where the CIM-WBEM objects are used to represent MSCs, a CIM modeling construct such as a CIM_Service object may be used to model a Management Service or Management Service Capability as a subclass of it. Actions required to solve a service affecting problems could be modeled using the CIM_Policy Set (i.e., using events-conditions-actions).

Each WBEM Server that implements an MSC may include the following components: a CIM Object Manager (CIMOM) broker, related providers and service capability recovery logic, forming a 2 layers hierarchy with other DMTF CIM WBEM-based management agents that run on SC hosts or Service Elements (SEs). The MSC providers (i.e., resource adaptors) can be implemented using the Java Connector Architecture (JCA). In such an arrangement an MSC would consist of a CIMOM broker, related providers and service capability recovery logic, forming a 2 layers hierarchy with other DMTF CIM WBEM-based management agents that run on SC hosts or Service Elements (SEs).

As mentioned above, according to one aspect of the service architecture, a Service Element (e.g., an S-CSCF service element) hosts a number of service capability instances. A Service Capability instance performs specific actions to address a service request from a user, satisfy specific SLA performance requirements (for example, response time, setup time, packet loss), send an event to a local Management Agent to notify it of, for example, alarm events, state changes and configuration changes.

The MSC may be provided to manage one or more hosted SCs (e.g., S-CSCF, Presence, Availability, and Mobility SCs and associated instances) and may also exchange information with sibling gateways, managed SCs, and upper Management Agents or systems (i.e., SLA-based Apps, NMSs, OSSs, BSSs). The interface to the MSC can be externalized using, for example, CORBA, SOAP and a set of transport bindings, including HTTP/HTTPS/SSL, RMI, JMS, IIOP. Alternatively, any other protocol which enables communication with a service may be substituted herein, and thus the present invention is not limited to a specific protocol.

The Service Operation Center 20 of FIG. 2 operates generally as follows. A SP publishes one or more Services/Service Capability templates in the Commercial Services Repository 66. Subscriber/clients request accesses to the services, which are deployed by the Life Cycle Manager 64 using the registries 60 and 62. Service/Service Capability instances for the subscriber are generated and executed by the Externalization servers 72, 74, 76. In addition, one or more Management Service Capability (MSC) instances may be generated and executed by an Externalization Server 72. The Externalization Server 72 may communicate directly with the Service/SC instances, associated MAs, via the gateway 80. In addition, direct access to the MSC is provided by to the operator via portal 52. With such an architecture, management capabilities may be modularized and externalized, thereby providing a low cost, scalable, robust and reliable method of managing services from heterogeneous SPs.

Figure 3:
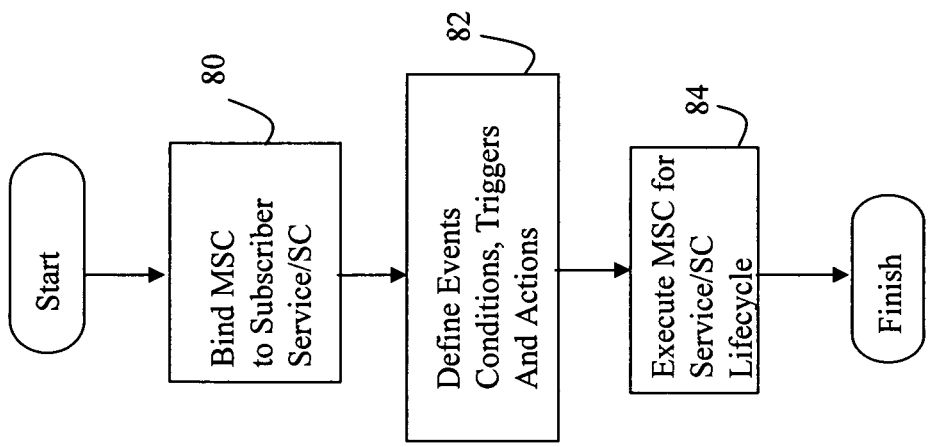
FIG. 3 is a flow diagram provided to illustrate several exemplary steps that may be performed when associating a management service capability with a Service/Service Capability.

Referring now to FIG. 3, an example of how an MSC may be used to control Services/SCs will be shown and described. In particular, an example of the externalization of Service Level Agreement (SLA) management will be described, although it will be appreciated that the below techniques may be easily applied to the management of other service characteristics, and the present invention is not limited merely to the externalization of SLA management.

As mentioned above, a Service Level Agreement (SLA) is a service contract between a service subscriber and a service provider, which defines the performance aspects to be guaranteed during the delivery and consumption of a service. In addition it defines ranges for subjective expectations of a service, such as Quality of Experience (QoE) which could be partially mapped to a set of related connectivity parameters and specific network elements used in delivering a service (e.g., types of Codecs, and service impacting parameters such as packet loss, response time, and so on).

An SLA plays a fundamental information role in all the management operations to be externalized. The SLA associated with a service/service instance consists of 2 main parts: the expected (i.e., signed-in/agreed/binding technical) SLA that represents the objective and subjective performance metrics (QoE, QoS, BW, response time, packet loss, etc) and the real-time (dynamic) SLA that represents a snapshot of SLA compliance or deltas relative to the expected SLA.

An SP could use an SLA to satisfy many purposes, including to find a trusted SP, capable of providing a service with the given SLA, to monitor a service for its compliance with the expected SLA and to take corrective actions, based on real-time deltas, or to analyze real-time SLA trends, taking into account historical trends, and to enable architecture planning decisions.

An SLA definition could be modeled using $1^{st}$ order (Boolean) logic to represent the set of conditions required to trigger actions (e.g., an event or to perform SLA related measurements during a specified period). For example, it should be possible to express any combination of conditions types to trigger an action, such as:

IF ((cond1 AND cond2) OR (cond3 AND !cond4)) AND (SC_y_congestion greaterThan x %) THEN action Typical conditions that may be used to trigger an action for SLA management may include performance parameter range conditions, performance threshold conditions, temporal conditions or cost related conditions.

A triggered action could by any type of service response including execution of a specific task, the collection of data associated with a recognized condition, etc. For example typical actions that may be performed in response to a trigger include invoking externalized management operations captured in a WSDL representation, invoking specific management processes captured in a ebXML representation, searching a service capability, using a service capability naming facility, accessing a specific management information about a related service capability instance, invoking a function of a management service capability (MSC) hosted in a Parlay/OSA Gateway or by a lookup in a Service Capability Naming Facility, accessing the MSC and invoking a management function or sending an event (e.g., notification) to interested parties [where an event could be modeled, for example, leveraging the DMTF CIM Indications documented in DSP0107]. The above list is exemplary and not exhaustive, and it is appreciated that many other types of service responses are included within the scope of the present invention.

An SLA definition could be stored as part of the Content Information domain 30, shown in FIG. 1 (SLA Model 34). An MSC could access the SLA definition and instances associated with Service or SC instances as well as information about MAs associated with them. The MSC SLA management object could be modeled using the DMTF CIM or TMF SID-based specifications, as described above.

In addition to SLA management, the present invention provides a structure for external management of a variety of service aspects. For example the present invention may be used to query & navigate a service, its instances, and information models, including expected SLA, real-time SLA, and historical SLAs per service instance. SQL-like syntax could be used to implement the query paradigm. In addition, the present invention may be used to add filters to a query to narrow its response scope, Publish/Subscribe Event per service instance to perform assurance activities (e.g., monitor, measure, diagnosis, trigger restoration and recovery actions) and perform transactional fulfillment of Service and Service Capability to bind a subscriber to a given SLA, and to perform the required service provisioning, bulk-configuration and activation. In addition, MSCs may be used to store and retrieve information content of Services, SCs and instances, perform Set and Get operations on SCs and SEs, and discover the state of specific Service/SC and associated instances. In addition, the discussed operations could have a scope attribute to be able to state the domains to which they will apply, as well as the ability to state a transactional behavior option on or off. These operations could also be modeled and captured as part of the Information Content domain, and thereby be modularized and made available for use by a variety of heterogeneous SPs.

One advantage of externalizing management in the above manner is that it enables reduction of the OpEx and TCO for Carriers, SPs and Large Enterprises by supporting a single point of entry and open API for Fulfillment, Assurance and Billing, as well as enabling open API integration with NMS, OSS and BSS. In essence, management functions are modularized, enabling the core structure of the management service to be used by many applications, independent of the interface, protocol, transport mechanism or information models associated with the applications using the management service.

Referring now to FIG. 3, a flow diagram illustrating exemplary steps that may be performed to build an externalized MSC using the present invention is shown. At step 80, the operator selects one of the management services in the Commercial Services Repository 66 (FIG. 2). The management services may include SLA and QoE assurance management operations, fulfillment operations, billing and charging related operations, service validation operations, service Life Cycle operations, and Information content access operations, and other similar services. The MSC is added to the Web Registry 14, and an MSC object is built in the Content Repository. As mentioned above, the MSC object could be implemented based on the DMTF CIM WBEM paradigm. At step 82 the SP defines the scope and attributes of the MSC object, for example by identifying selected events, conditions, thresholds, actions, etc. for the management function. The selected events, actions, etc., may be used to control the hierarchy of Management Agents associated with the MSC. The MSC object executes, at step 84, for the Life Cycle of the associated Service/SC.

Figure 4:
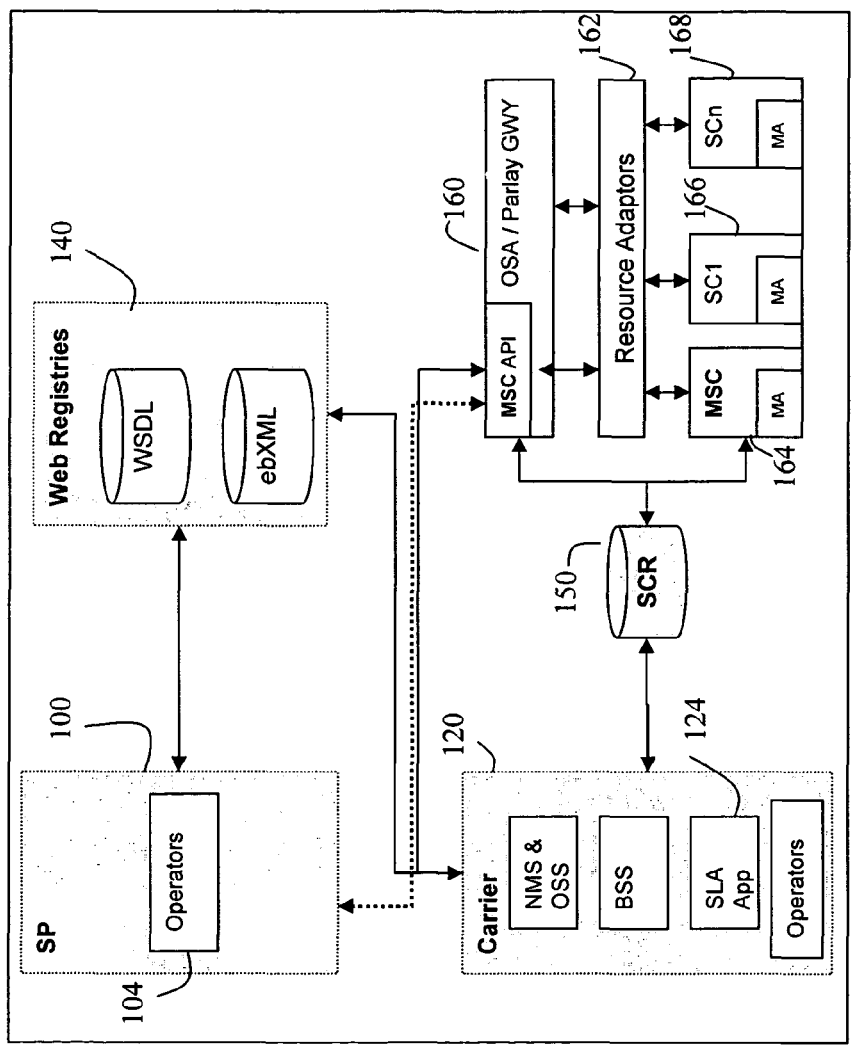
FIG. 4 is a logical embodiment of a service architecture in which the present invention may be used.

Referring now to FIG. 4, an alternative embodiment of the present invention illustrates a logical block diagram of a Services Operations Center (SOC) is provided for the purposes of illustrating one method of providing open management in a service environment. A Service Provider 100 may host one or more operators 104. Each of the operators may use the Web registries to access Services/Service Capabilities, including Management Service Capabilities. Logical addresses from the SP are translated into physical addresses in the Web Registries 140.

A Carrier 120, stores a variety of services, including management services. For example, the carrier may store SLA management service such as SLA App 124. As mentioned above the gateway 160 provides an interface between the SP and the various Service/SC, MSC and associated instances.

According to one aspect of the invention, the Gateway may include a MSC API which interfaces the SP to Management Service Capabilities. Shown logically positioned between the gateway 160 and the service instances 164, 166 and 168 is Resource Adaptors 162. In one embodiment, the Resource Adaptors are used to link Information Content to the Service/SC/MSC and instances. A Service Capability Register (SCR) 150 provides a direct interface between the various management applications (e.g., NMS, OSS, BSS) and the associated MSCs. Such an arrangement enables open management of Services, through the externalization of management services available in Web Registries, an MSC OSA/Parlay API, and a SCR.

Accordingly, an architecture which enables the externalization of management services for use by a variety of heterogeneous service applications is provided. Such an arrangement provides a number of benefits to carriers and SPs, including the ability to enable effective service management with reduced OpEx and TCO, rapidly integrate and manage end to end services and to deploy, deliver, and activate services in a reliable manner. The result is a low cost, robust and reliable service offering environment, which can be easily scaled to support a variety of heterogeneous service offerings.

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A system for open management of a service comprising:
    a network device having a memory in which is stored a registry of:
        service capabilities associated with different protocols, each service capability being a function which is insufficient to provide a service, groups of which are combined to provide a service instance based on different protocols; and
        a plurality of management service capabilities, each of which provides a management service capability instance for tracking functions of ones of the service instances;
    a cluster server for executing the instances of management services; and
    an application programming interface via which the management service capability instances are accessed by a client.

2. The system of claim 1, wherein the application programming interface translates a plurality of network management protocols into a protocol of the management service capability.

3. The system of claim 2, wherein the management service capability uses a Distributed Management Task Force (DMTF) Common Information Model-Web Based Enterprise Management (CIM-WBEM) protocol.

4. The system of claim 1 wherein the management service capabilities include fulfillment service operations.

5. The system of claim 1 wherein the management service capabilities include assurance service operations.

6. The system of claim 1 wherein the management service capabilities include billing service operations.

7. The system of claim 1 wherein the management service capabilities include Service Level Agreement compliance operations.

8. The system of claim 1, wherein the management service capabilities include query services which may be used to query information content of the system.

9. The system of claim 1 wherein the management service capabilities include filtering operations.

10. The system of claim 1 wherein the management services include event subscription operations.

11. The system of claim 1 wherein the management services include information retrieval capabilities.

12. A method for open management of a service provided in a network comprising:
    combining service capabilities associated with different protocols to provide an instance of the service based on the different protocols, each service capability being a function which is insufficient to provide a service;
    maintaining a plurality of management service capabilities, each of which provides a management service capability instance for tracking functions of ones of the service instances;
    storing the management service capability instances in a registry; and
    in response to input provided via an interface, executing a corresponding management service capability instance to manage the corresponding tracked service instance.

13. The method of claim 12, wherein the management service instance uses a Distributed Management Task Force (DMTF) Common Information Model-Web Based Enterprise Management (CIM-WBEM) protocol.

14. The method of claim 12 wherein the management service capabilities include fulfillment service functionality.

15. The method of claim 12 wherein the management service capabilities include assurance service functionality.

16. The method of claim 12 wherein the management service capabilities include billing service functionality.

17. The method of claim 12 wherein the management service capabilities include Service Level Agreement compliance functionality.

18. The method of claim 12, wherein the management service capabilities include query services which may be used to query information content of a system.

19. The method of claim 12 wherein the management service capabilities include filtering functionality.

20. The method of claim 12 wherein the management services include event subscription functionality.

21. The method of claim 12 wherein the management services include information retrieval capabilities.

* * * * *